Patented Jan. 28, 1936

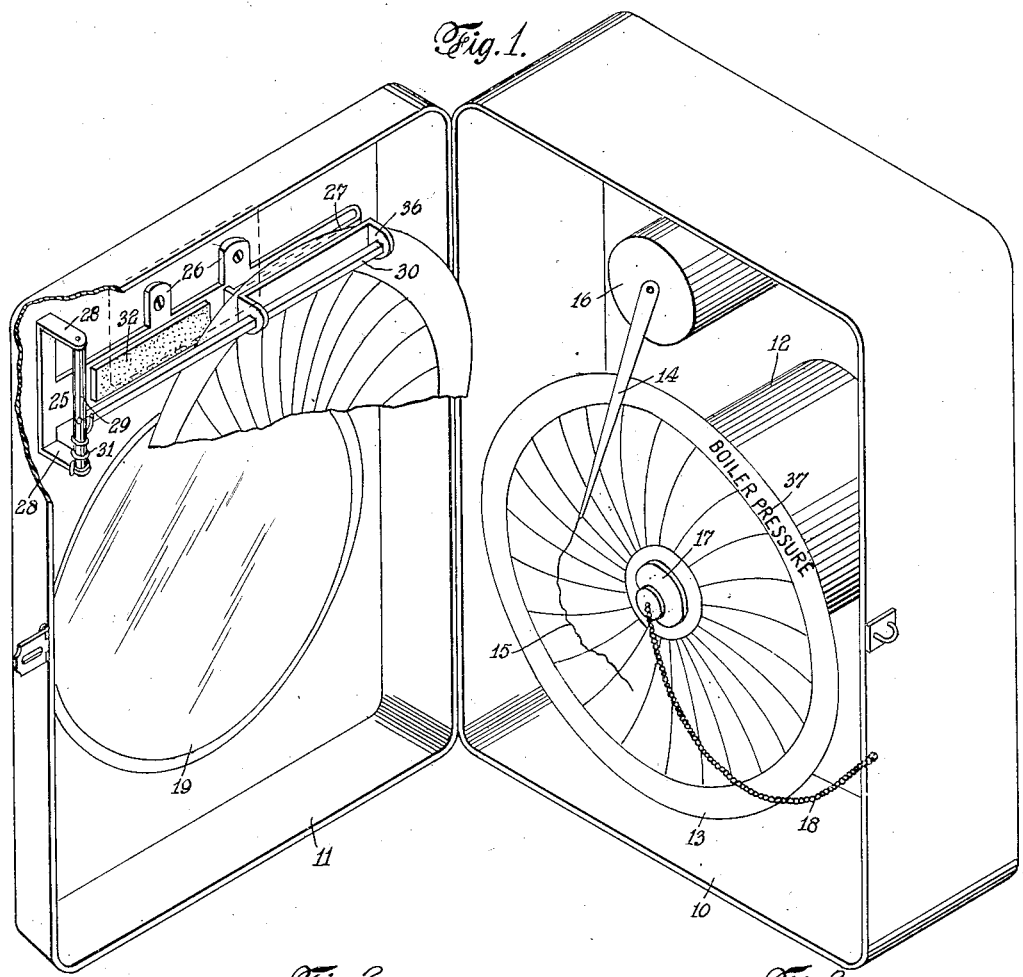
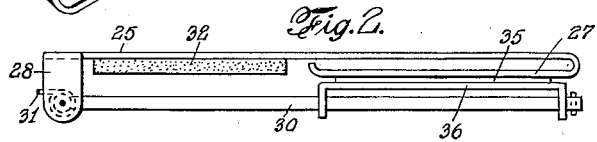
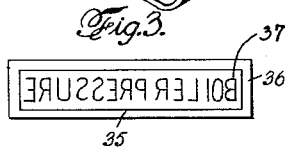
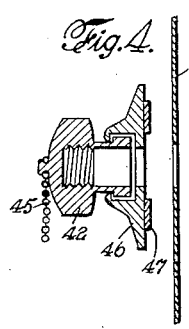
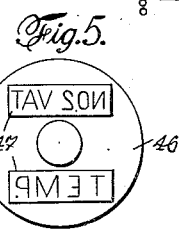
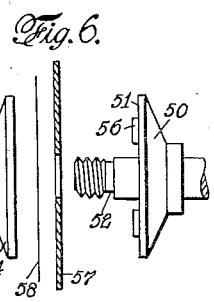

2,029,029

UNITED STATES PATENT OFFICE 2,029,029

IMPRINTING MEANS FOR IDENTIFYING CHARTS OF RECORDING INSTRUMENTS

Herman Koester, Waterbury, Conn., assignor to The Bristol Company, Waterbury, Conn., a corporation of Connecticut Application June 15, 1934, Serial No. 730,740

3 Claims. (Cl. 234—1)

The invention relates to imprinting means for affording an identifying mark or legend, and more particularly to such means as employed in connection with the identification of removable charts of recording meters and like instruments with the particular individual instruments from which a record was obtained.

In the use of recording instruments, it is necessary to change the record chart from time to time, the intervals depending upon the class of instrument and the type of use to which it is applied. At the time of changing of these records, it is customary, where several similar instruments are used, to place upon each chart, either by writing or by stamping thereon, an identifying mark or legend so that these charts may not be confused. In the interest of neatness, accuracy and time-saving, the use of a rubber stamp or the like has much to recommend it; but in order that the full advantage of the practice may be realized, it becomes necessary that the attendant whose duty it is to service the instrument carry such stamp directly to the particular instrument and make the identifying indication upon the chart at the time of locating the same in place or when removing it. As an alternative, a stamp member may be provided and left within the case of the instrument for use on the chart thereof; but this practice makes for untidiness and does not entirely eliminate the possibility of confusion due to the stamps becoming interchanged.

The present invention has for an object the provision in connection with instruments of the recording type, of stamping means or an imprinting member which is permanently attached to the instrument, being, however, conveniently accessible for the stamping of a chart at the time of changing of the same in the instrument or of locating the same therein.

A further object of the invention contemplates the provision, where necessary, of inking means conveniently located relatively to said stamping means, and whereby the latter may be caused to make a legible and distinct mark, as upon the face of the chart.

In carrying out the invention, imprinting means are permanently, but movably, connected with the casing of the instrument and are so arranged with respect to the record chart thereof as to be readily accessible for impressing thereon indicia identifying said charts with the particular instrument.

For example, a bracket may be rigidly secured to the inner surface of the cover of the instrument casing, said bracket providing a platen portion at one end and mounting means at the opposite end for an indicia-bearing member. The latter is arranged to be reciprocably mounted upon a member carried by the mounting means and yieldably urged toward the bracket.

Intermediate the mounting means and platen there is carried by the bracket an inking pad, the indicia-bearing member being adapted to be placed in juxtaposed relationship to the inking pad or the platen, in the latter instance for effecting an imprint upon the record chart and in the former instance for inking the said indicia-bearing member, it being understood that the member carrying the indicia-bearing member is yieldingly urged toward the said inking pad, causing the said indicia-bearing member to be normally held in contact therewith.

Or, the imprinting means may be associated with the hub cap of the instrument adapted for securing the chart in position in the instrument and either directly therewith or as a part of the cooperating chart-supporting hub, said cap in the former case being permanently connected with the casing of said instrument.

The nature of the invention, however, will best be understood when described in connection with the accompanying drawing, in which:

Fig. 1 shows in perspective a recording instrument of the circular-chart type, the same illustrating the cover of the instrument in open position and equipped with the novel imprinting means, with fragment of a record chart shown in position for effecting thereon the desired imprint.

Fig. 2 is a plan view, on an enlarged scale, of one embodiment of the novel imprinting means.

Fig. 3 is a plan view of the indicia-bearing element of the novel imprinting means.

Fig. 4 is an exploded view, in part longitudinal section and elevation, of a modified arrangement in which the imprinting means is embodied in the means for holding the chart for use in the instrument.

Fig. 5 is a plan view of the under face of the hub cap portion.

Fig. 6 is an exploded view illustrating a further modification; and Fig. 7 is a plan view of the abutment face for the hub cap thereof.

Referring to the drawing, more particularly Fig. 1, 10 designates the casing provided with the swinging door 11, said casing being designed to retain permanently a suitable timing member represented at 12 and adapted for the rotation of a record chart 13. A suitable marking member 14 is designed to move over this chart to effect a record 15 thereon, the marking member being actuated by a suitable responsive element indicated at 16 and subject to the magnitude of a variable condition.

The chart 13 is secured to the timing mechanism by means of a hub and screw cap 17, for example of the nature set forth in U. S. Letters Patent #1,478,861, said cap being designed to be permanently associated with the instrument as in being secured to some stationary part thereof, for example, by means of a flexible chain or the like 18.

The cover member 11 is hinged to the casing 10 along one edge and is made of sufficient depth to provide clearance from the recording apparatus and the hub cap aforesaid; and when closed over the casing effects a complete closure for the active parts of the instrument. The chart and recording mechanism are visible from the outside of the casing through a glass window 19 coaxially mounted with respect to the chart 13. The foregoing is descriptive of the usual type of recording instrument and no invention is claimed for any of the features set forth.

In accordance with the invention, the said cover or door 11 is designed to carry the novel imprinting means. Thus, a bracket 25 may be rigidly secured to the inner surface of the door 11, preferably at its upper portion, as by means of attaching lugs 26 integral therewith. At one end the bracket or plate is turned back upon itself to provide a flat platen 27, while at its opposite end a pair of arms 28 extend outwardly from the plate to form a bearing bracket in which is journalled a spindle 29. To this is attached a cantilever arm 30 formed of rectangular material, and a spring 31 coiled about the spindle and having one end secured thereto and the other to the bracket is so arranged that the cantiliver arm will be yieldingly urged toward the bracket or plate 25.

Upon the surface of the plate 25 and between the platen 27 and bearing bracket comprising the arms 28 is secured a pad 32 of absorbent material, such as felt, and charged with a suitable ink substance. With this pad as well as with the platen 27 is adapted to engage a stamp or indicia-bearing member 35 carried by a metal slider 36 reciprocable along the arm 30 and prevented from rotating thereon by the rectangular conformation of the same. The slider may thus be juxtaposed to the said platen for receiving between the platen and the stamp the outer portion of a record chart, as indicated in Fig. 1, for stamping on its margin the identifying marks 37.

In positioning the chart for stamping, the arm 30 may be swung outwardly in opposition to spring 31 for convenient insertion of said chart; and in impressing the identifying mark thereon, sufficient pressure is manually applied to the slider 36. After stamping of the chart, the slider member is manually returned to a position of engagement with the pad 32 to which it is retained by the action of spring 31 until again required for use.

Identifying means may be associated, also, with the usual chart mounting element and embodying, Fig. 4, the rotatable abutment or hub 40 of the conventional type with the outwardly extending threaded stem 41 adapted to receive the hub cap 42 to hold between the same and the relatively large surface portion 43 of the abutment the record chart 44. The hub cap is to be secured to the instrument casing (not shown) in the usual manner, as by means of the flexible chain or the like 45. It is internally threaded to engage the threaded portion of the stem 41 in clamping a chart to the hub portion and carries, furthermore, a swivel plate 46 for effecting the clamped relationship, whereby said plate is not subject to sliding action relative to the surface of the chart when the cap portion 42 is rotated on the stem 41 in the clamping of the chart in place.

Upon the outer flat surface of the plate 46 are provided in relief indicia 47 formed of resilient material such as rubber, and adapted for juxtaposition in the clamping operation to the surface 43 of the hub and which is of relatively great diameter in order to receive the pressure of the said indicia as directed upon the chart 44. There may be thus impressed upon the said chart, numerals, words or other markings to identify it with the instrument upon which it is used. The stamping member embodying the cap and the plate with indicia may be suitably inked from a stamping pad which may be conveniently located in the instrument casing, or be carried by the attendant whose duty it is to change charts.

Moreover, the cap being permanently attached, through the chain 45, it is impossible for these stamping means to become interchanged and the impressions on the chart confused.

A further modification is indicated in Figs. 6 and 7 and embodying the general structure of clamping device indicated in Fig. 4. The hub 50 is similarly provided with the substantial surface 51 and a threaded stem 52, while the hub cap comprises the cap portion 53 with swivel plate 54, the cap having also the securing chain 55 for attachment to the instrument casing (not shown). The indicia 56, however, are in this embodiment carried by the hub or rather the surface 51 thereof and formed with sharp edges adapted to be pressed into the material of the chart 57 when the plate 54 is pressed against the hub in clamping the said chart in position thereon. There is interposed between this chart and the plate 54, and preferably attached to the latter as by cementing it thereto, a disk of carbon paper 58 or the like, having its coated surface toward the chart. When the chart is then clamped, as aforesaid, the indicia 56 being pressed into the material of the chart from the rear, there will be made to appear upon the front of the chart an image of the said indicia which serve to identify the chart with respect to the instrument with which it is used.

I claim:

1. Stamping means for impressing upon the removable charts of graphic instruments indicia identifying the same, said means being attachable to the instrument and comprising a reciprocable element, a platen and inking means lying substantially in a common plane, and means to urge the reciprocable element toward the said plane, whereby indicia may be impressed upon the chart when the latter is presented between the reciprocable element and platen and the said element inked when juxtaposed to the inking means.

2. Stamping means for impressing upon the removable charts of graphic instruments indicia identifying the same, said means being attachable to the instrument and comprising a bracket secured to the instrument and having a platen portion at one end and a spindle at the opposite end, and an intermediate inking pad, an arm mounted on the spindle and yieldingly urged toward the bracket, and an indicia-bearing member reciprocably mounted upon the arm for juxtaposed relationship to the said platen and the said inking means respectively.

3. Stamping means for impressing upon the removable charts of graphic instruments indicia identifying the same, said means being attachable to the instrument and comprising a bracket formed at one end to afford a platen and having outwardly projecting fingers at the opposite end to afford journals, said bracket being provided with attaching lugs extending from one side and between the said ends of the bracket, an inking pad secured to the bracket between the fingers and the platen, a spindle journalled in the said fingers, an arm mounted thereon and extending longitudinally of the bracket and over its pad and platen, resilient means urging the said arm toward the bracket, and an indicia-bearing member slidable along the said arm.

HERMAN KOESTER.